United States Patent [19]
Bridge

[11] Patent Number: 5,837,891
[45] Date of Patent: Nov. 17, 1998

[54] TIRE AIR PRESSURE MEASURING DEVICE

[76] Inventor: David Bridge, 1706-2004 Fullerton Avenue, North Vancouver, BC, Canada, V7P-3G8

[21] Appl. No.: 751,236

[22] Filed: Nov. 18, 1996

[51] Int. Cl.[6] .................................................. B60C 23/04
[52] U.S. Cl. ..................... 73/146.8; 23/146.5; 116/34 R; 340/447
[58] Field of Search ................................ 73/146.3–146.8; 116/34 R; 340/445–448

[56] References Cited

U.S. PATENT DOCUMENTS

| | | | |
|---|---|---|---|
| 3,533,063 | 10/1970 | Garcia | 340/447 |
| 5,335,540 | 8/1994 | Bowler et al. | 73/146.5 |

*Primary Examiner*—George M. Dombroske
*Assistant Examiner*—Joseph L. Felber

[57] ABSTRACT

A tire air pressure measuring device comprised of a first housing adapted for coupling with a valve stem of a tire. A valve pressure indicator is secured within a second housing. The second cylindrical housing couples with the first cylindrical housing. The valve pressure indicator has a needle extending outwardly therefrom. The needle extends through the first cylindrical housing to engage a contact point of the valve stem of the tire. A battery is secured within a third housing. The third cylindrical housing couples with the second cylindrical housing. The battery has wiring extending outwardly therefrom to electrically couple with the valve pressure indicator. A transmitter is secured within a cylindrical housing. The fourth cylindrical housing couples with the third cylindrical housing. The transmitter has a pair of wires one of which extends outwardly therefrom to electrically couple with the battery and another wire coupling with the valve pressure indicator.

1 Claim, 6 Drawing Sheets

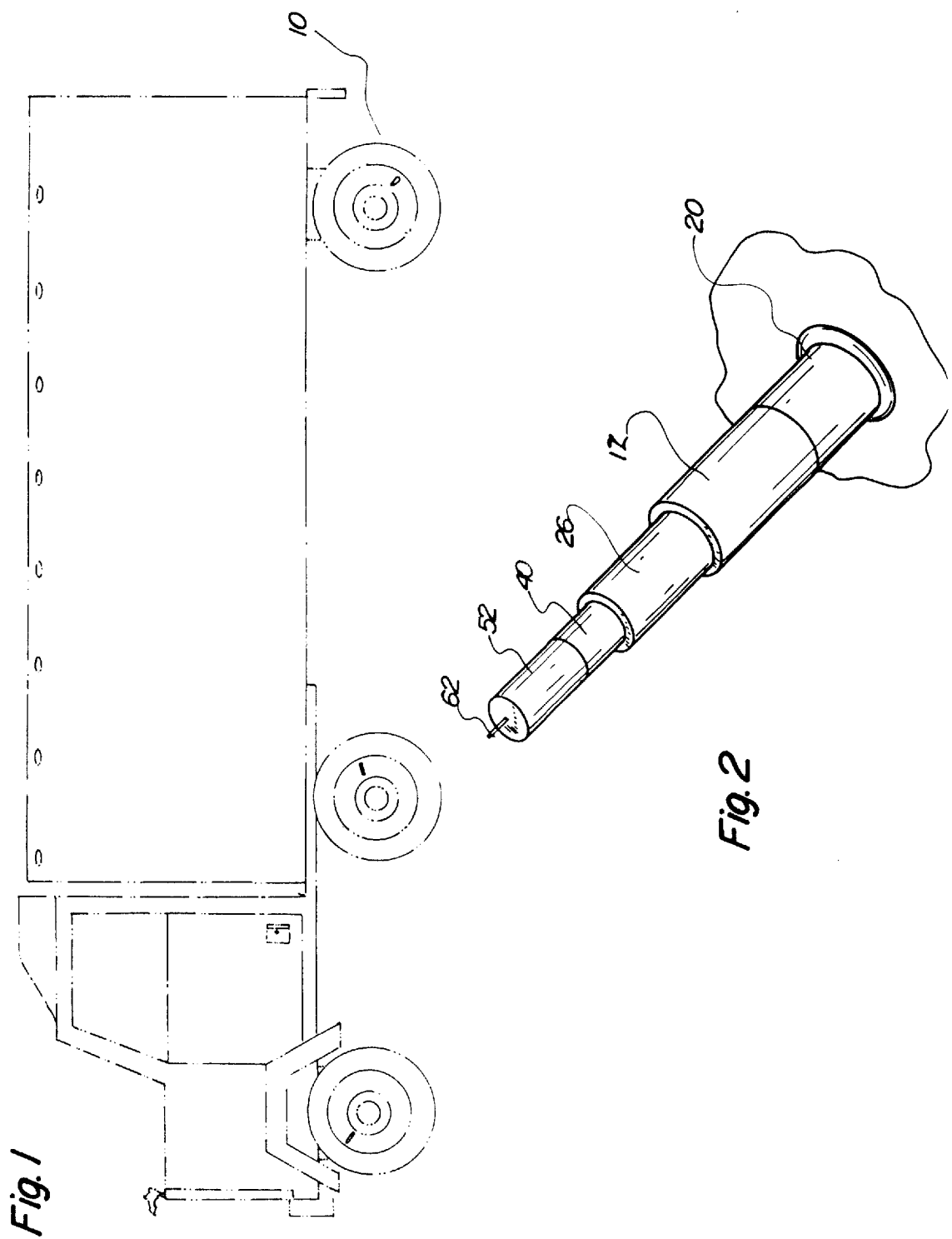

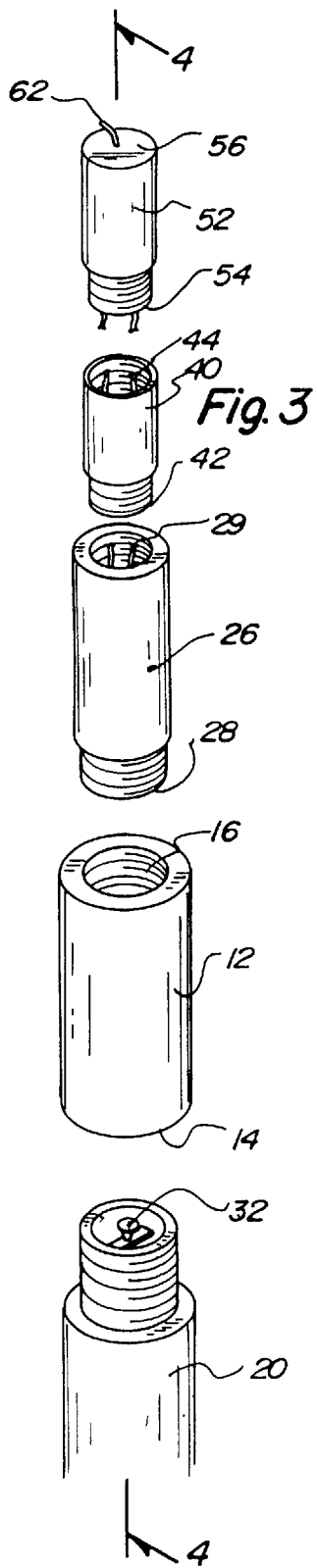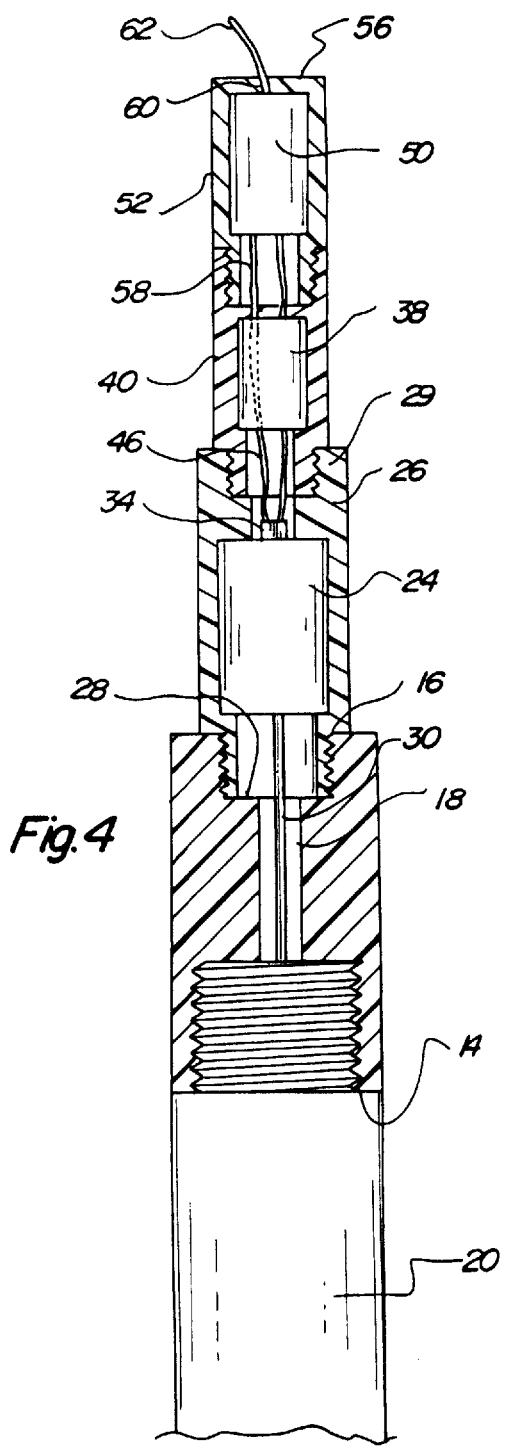

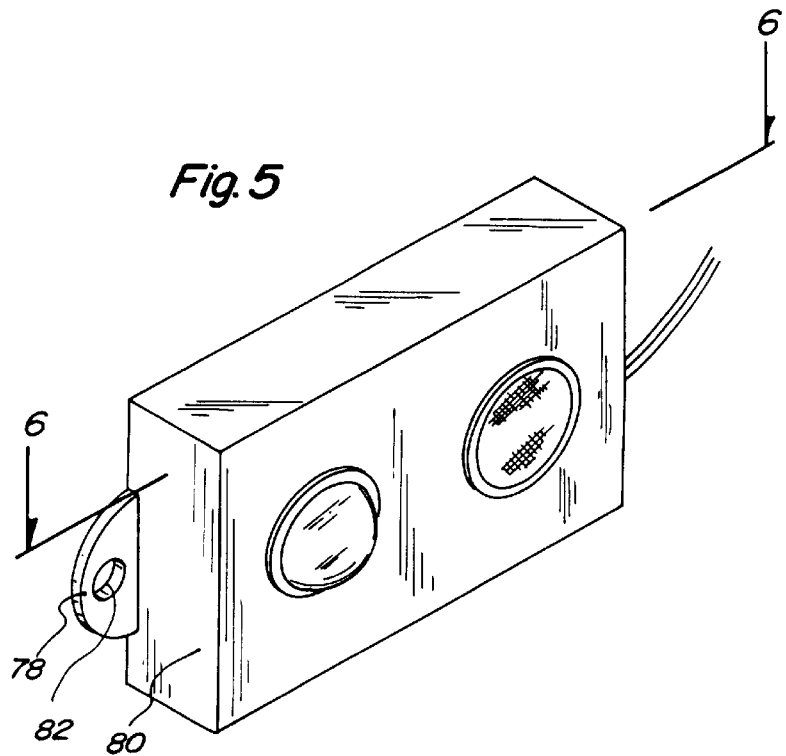
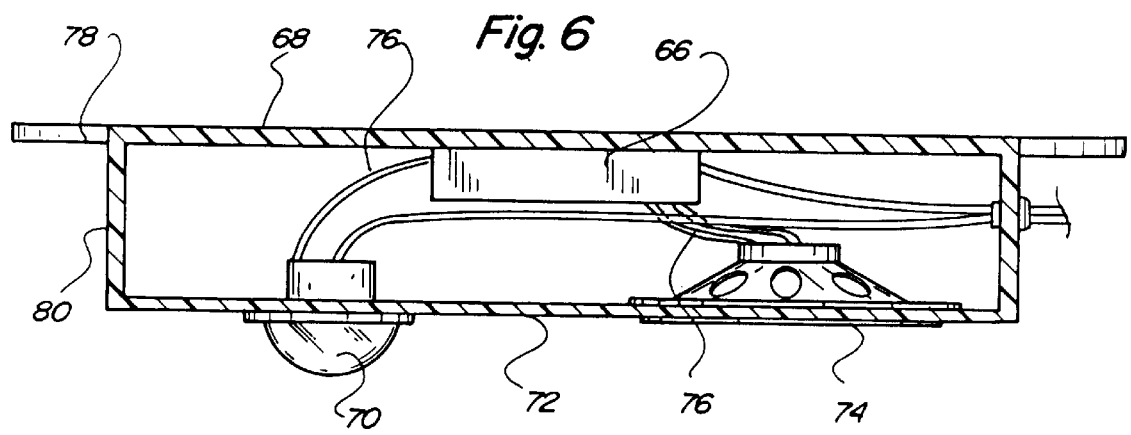

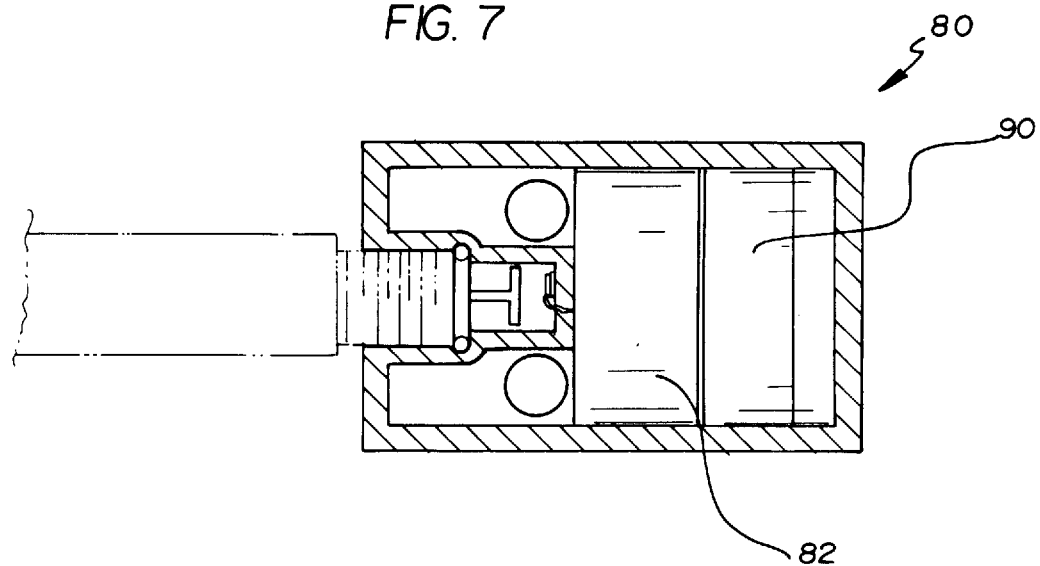
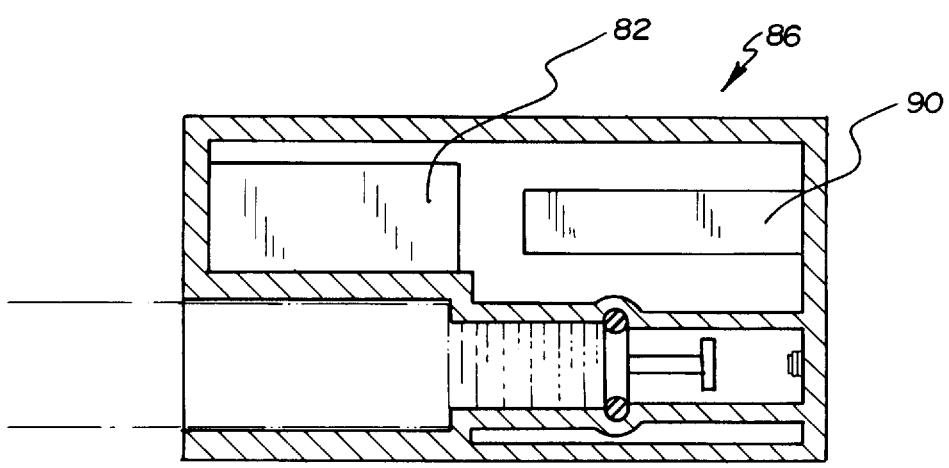

TIRE AIR PRESSURE MEASURING DEVICE

BACKGROUND OF THE INVENTION

1. Field of the Invention

The present invention relates to a tire air pressure measuring device and more particularly pertains to detecting the release of air from a tire and notifying a driver of such an occurrence with a tire air pressure measuring device.

2. Description of the Prior Art

The use of inflation and pressure indicators is known in the prior art. More specifically, inflation and pressure indicators heretofore devised and utilized for the purpose of indicating the pressure of a tire are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,554,527 to Muller discloses a tire height sensor with valve stem attaching transmitter module.

U.S. Pat. No. 3,533,063 to Garcia discloses a low pressure pneumatic tire transmitter.

U.S. Pat. No. 5,325,886 to Klink discloses an inflation and pressure indicator apparatus for tires.

U.S. Pat. No. Des. 243,391 to Schmidt discloses the ornamental design for a tire valve extender.

U.S. Pat. No. 5,121,780 to Goodman discloses a flexible air valve extension.

U.S. Pat. No. 5,289,160 to Fiorletta discloses a tire pressure monitoring system.

U.S. Pat. No. 5,335,540 to Bowler et al. discloses a tire monitoring apparatus and method.

While these devices fulfill their respective, particular objective and requirements, the aforementioned patents do not describe a tire air pressure measuring device for detecting the release of air from a tire and notifying a driver of such an occurrence.

In this respect, the tire air pressure measuring device according to the present invention substantially departs from the conventional concepts and designs of the prior art, and in doing so provides an apparatus primarily developed for the purpose of detecting the release of air from a tire and notifying a driver of such an occurrence.

Therefore, it can be appreciated that there exists a continuing need for new and improved tire air pressure measuring device which can be used for detecting the release of air from a tire and notifying a driver of such an occurrence. In this regard, the present invention substantially fulfills this need.

SUMMARY OF THE INVENTION

In the view of the foregoing disadvantages inherent in the known types of inflation and pressure indicators now present in the prior art, the present invention provides an improved tire air pressure measuring device. As such, the general purpose of the present invention, which will be described subsequently in greater detail, is to provide a new and improved tire air pressure measuring device and method which has all the advantages of the prior art and none of the disadvantages.

To attain this, the present invention essentially comprises a first cylindrical housing having an internally threaded open first end and an internally threaded open second end. The first cylindrical housing has a central longitudinal channel extending from the open first end to the open second end. The internally threaded open first end is adapted for coupling with an externally threaded valve stem of a tire. A valve pressure indicator is secured within a second cylindrical housing. The second cylindrical housing has an externally threaded open first end and an internally threaded open second end. The externally threaded open first end couples with the internally threaded open second end of the first cylindrical housing. The valve pressure indicator has a needle extending outwardly therefrom. The needle extends through the central longitudinal channel of the first cylindrical housing to engage a contact point of the valve stem of the tire. A battery is secured within a third cylindrical housing. The third cylindrical housing has an externally threaded open first end and an internally threaded open second end. The externally threaded open first end couples with the internally threaded open second end of the second cylindrical housing. The battery has wiring extending outwardly therefrom to electrically couple with the valve pressure indicator. A transmitter is secured within a fourth cylindrical housing. The fourth cylindrical housing has an externally threaded open first end and a closed second end. The externally threaded open first end couples with the internally threaded open second end of the third cylindrical housing. The transmitter has a pair of wires one of which extends outwardly therefrom to electrically couple with the battery and another wire coupling with the valve pressure indicator, as shown in the Figures. The second end has an aperture formed therethrough. An wire extends outwardly of the aperture from the transmitter and acts as an antenna. A receiver is secured within an interior of a rectangular housing. The housing has a flashing light mechanism secured within a front wall thereof. The housing has a speaker secured within the front wall thereof adjacent to the flashing light mechanism. The receiver is in communication with the second wire of the transmitter. The receiver has wiring extending to electrically couple with the flashing light mechanism and the speaker. The rectangular housing has a semi-circular securement portion secured to a side wall thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tire air pressure measuring device which has all the advantages of the prior art inflation and pressure indicators and none of the disadvantages.

It is an other object of the present invention to provide a new and improved tire air pressure measuring device which may be easily and efficiently manufactured and marketed.

It is a further object of the present invention to provide a new and improved tire air pressure measuring device which is of durable and reliable construction.

An even further object of the present invention is to provide a new and improved tire air pressure measuring device which is susceptible of a low cost of manufacture with regard to both materials and labor, and which accordingly is then susceptible of low prices of sale to the consuming public, thereby making such a tire air pressure measuring device economically available to the buying public.

Still yet another object of the present invention is to provide a new and improved tire air pressure measuring device which provides in the apparatuses and methods of the prior art some of the advantages thereof, while simultaneously overcoming some of the disadvantages normally associated therewith.

Even still another object of the present invention is to provide a new and improved tire air pressure measuring device for detecting the release of air from a tire and notifying a driver of such an occurrence.

Still yet another object of the present invention is to indicate to a user a compensated specific pressure value of each of the tires of a vehicle with such pressure value being a function of both the actual pressure and the temperature of the environment.

Lastly, it is an object of the present invention to provide a new and improved tire air pressure measuring device comprised of a first housing adapted for coupling with a valve stem of a tire. A valve pressure indicator is secured within a second housing. The second cylindrical housing couples with the first cylindrical housing. The valve pressure indicator has a needle extending outwardly therefrom. The needle extends through the first cylindrical housing to engage a contact point of the valve stem of the tire. A battery is secured within a third housing. The third cylindrical housing couples with the second cylindrical housing. The battery has wiring extending outwardly therefrom to electrically couple with the valve pressure indicator. A transmitter is secured within a cylindrical housing. The fourth cylindrical housing couples with the third cylindrical housing. The transmitter has a pair of wires one of which extends outwardly therefrom to electrically couple with the battery and another wire coupling with the valve pressure indicator.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is view of the present invention in place on a tire of a truck.

FIG. 2 is a perspective view of the preferred embodiment of the tire air pressure measuring device constructed in accordance with the principles of the present invention.

FIG. 3 is an exploded front view of the present invention.

FIG. 4 is a cross-sectional view as taken along line 4—4 of FIG. 3.

FIG. 5 is a perspective view of the receiver of the present invention.

FIG. 6 is a cross-sectional view as taken along line 6—6 of FIG. 5.

FIG. 7 is a cross-sectional view of a first type of housing of an alternate embodiment of the present invention.

FIG. 8 is a cross-sectional view of a second type of housing of the alternate embodiment of the present invention.

The same reference numerals refer to the same parts through the various Figures.

DESCRIPTION OF THE PREFERRED EMBODIMENT

Figure 9:
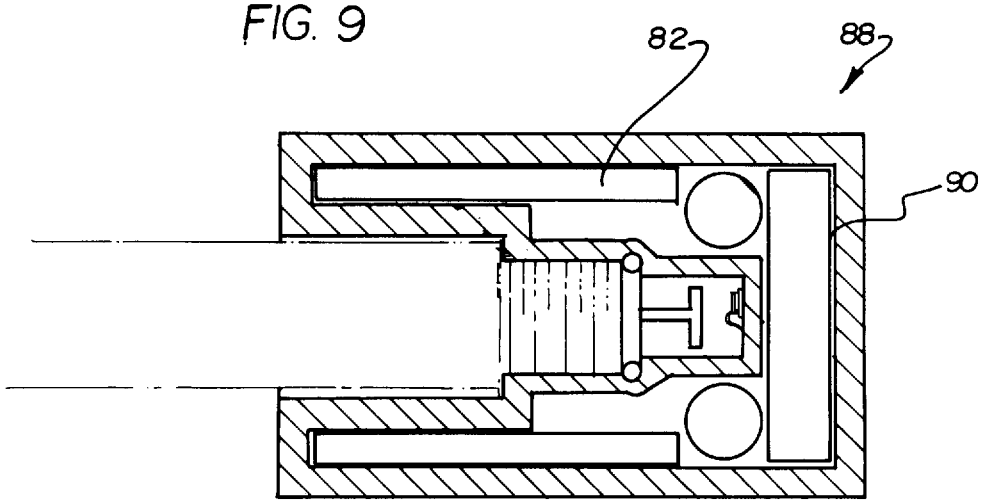
FIG. 9 is a cross-sectional view of a third type of housing of the alternate embodiment of the present invention.
Figure 10:
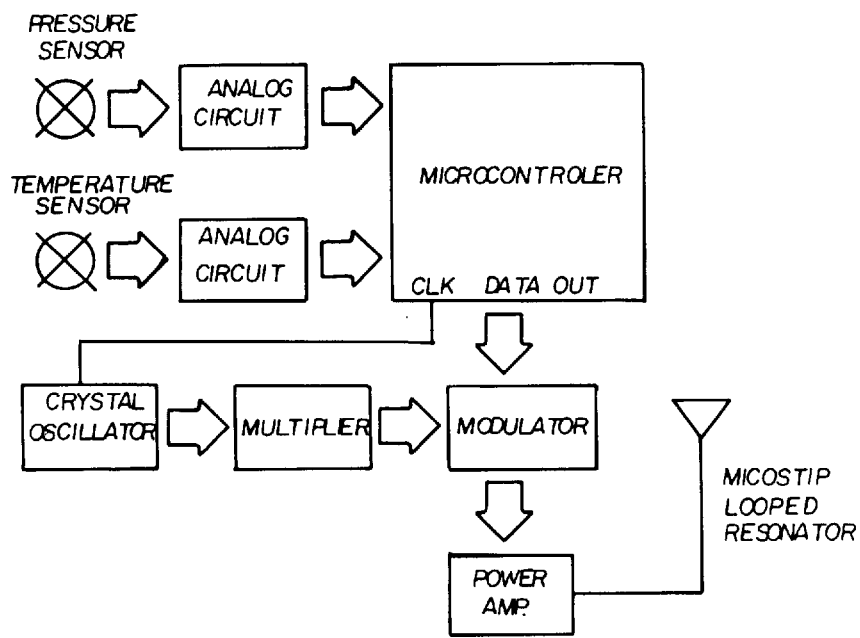
FIG. 10 is a schematic of the transmitter and related circuitry of the alternate embodiment.
Figure 11:
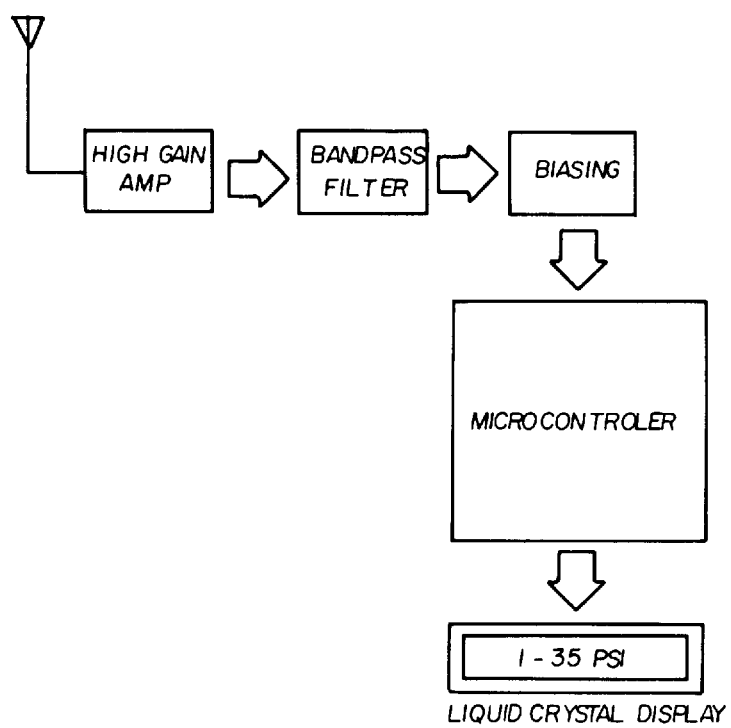
FIG. 11 is a schematic of the receiver and related circuitry of the alternate embodiment.

With reference now to the drawings, and in particular, to FIG. 2 thereof, the preferred embodiment of the new and improved tire air pressure measuring device embodying the principles and concepts of the present invention and generally designated by the reference number 10 will be described.

Specifically, it will be noted in the various Figures that the device relates to a new and improved tire air pressure measuring device for detecting the release of air from a tire and notifying a driver of such an occurrence. In its broadest context, the device consists of a first cylindrical housing, a valve pressure indicator, a battery, a transmitter, and a receiver. Such components are individually configured and correlated with respect to each other so as to attain the desired objective.

The first component of the device 10 is a first cylindrical housing 12. The first cylindrical housing 12 has an internally threaded open first end 14 and an internally threaded open second end 16. The first cylindrical housing 12 has a central longitudinal channel 18 extending from the open first end 14 to the open second end 16. The internally threaded open first 14 end is adapted for coupling with an externally threaded valve stem 20 of a tire. The first cylindrical housing 12 is of a same width as that of the valve stem 20. The width of the central longitudinal channel 16 is about ¼ the width of the first cylindrical housing 12.

The second component of the device 10 is a valve pressure indicator 24. The valve pressure indicator 24 is secured within a second cylindrical housing 26. The second cylindrical housing 26 has an externally threaded open first end 28 and an internally threaded open second end 29. The externally threaded open first end 28 couples with the internally threaded open second end 16 of the first cylindrical housing 12. The valve pressure indicator 24 has a needle 30 extending outwardly therefrom. The needle 30 extends through the central longitudinal channel 18 of the first cylindrical housing 12 to engage a contact point 32 of the valve stem 20 of the tire. The second cylindrical housing 26 can be simply removed from the first cylindrical housing 12 in the same manner as removing a cap from a tire stem. The valve pressure indicator 24 has a electrical securement portion 34 on an opposing side from the needle 30.

The third component of the device 10 is a battery 38. The battery 38 is secured within a third cylindrical housing 40. The third cylindrical housing 40 has an externally threaded open first end 42 and an internally threaded open second end 44. The externally threaded open first end 42 couples with the internally threaded open second end 29 of the second cylindrical housing 26. The battery 38 has wiring extending outwardly therefrom to electrically couple with the electrical securement portion 34 of the valve pressure indicator 24. The battery 38 electrically charges the valve pressure indicator 24.

The fourth component of the device 10 is a transmitter 50. The transmitter 50 is secured within a fourth cylindrical housing 52. The fourth cylindrical housing 52 has an externally threaded open first end 54 and a closed second end 56. The externally threaded open first end 54 couples with the internally threaded open second end 44 of the third cylindrical housing 40. The transmitter 50 has two wires one of which extends outwardly therefrom to electrically couple with the battery 38 and another wire coupling with the valve pressure indicator, as shown in the Figures. The second end 56 has an aperture 60 formed therethrough. Another wire 62 extends outwardly of the aperture 60 from the transmitter 50 and acts as an antenna. The transmitter 50 is electrically powered by the battery 38. After the valve pressure indicator 24 senses a change in the pressure value of one of the tires which is greater than a predetermined amount it sends a signal to the transmitter 50 giving indication of such an occurrence.

The final component of the device 10 is a receiver 66. The receiver 66 is secured within an interior of a rectangular housing 68. The housing 68 has a flashing light mechanism 70 secured within a front wall 72 thereof. The housing 68 has a speaker 74 secured within the front wall 72 thereof adjacent to the flashing light mechanism 70. The receiver 66 is in communication with the second wire 62 of the transmitter 50. The receiver 66 has wiring 76 extending to electrically couple with the flashing light mechanism 70 and the speaker 74. The rectangular housing 68 has a semi-circular securement portion 78 secured to opposing side walls 80 thereof. The semi-circular securement portion has an aperture 82 formed therethrough thereby allowing for the receiver to be secured within a truck or other type vehicle. After the transmitter 50 receives a change in the pressure value of one of the tires which is greater than a predetermined amount from the valve pressure indicator 24, a signal is then sent to the receiver 66. Once the receiver 66 accepts the signal it hereby causes the flashing light mechanism 70 to start flashing and also causes an audio signal to be emitted from the speaker 74. As such, the receiver is adapted to actuate the flashing light mechanism and the speaker upon a change in the pressure value of one of the tires which is greater than a predetermined amount. This will alert a driver of the truck or other vehicle of an air problem with one of his tires. The device 10 increases safety. The device 10 reduces the chances of having to replace a flat tire that is destroyed because the driver is unaware of the flat. The device 10 also reduces the amount of destroyed tires from trucks and other vehicles that litter roads and become safety hazards for other motorists.

In an alternate embodiment shown in FIGS. 7–11, many modifications are made to improve the operation of the present invention. First, the housing is designed with the size and weight of the present invention, forces involved, and further environmental issues taken into consideration. It was noted that the circuitry of the present invention will be exposed to the worst environmental conditions for an electronic application. Therefore, the enclosure is constructed to endure most of these conditions instead of the electronic package with the exception of temperature which will be affecting both.

With regard to size and weight, three basic types of enclosures for this application are considered. A first type housing 80, shown in FIG. 7, has the shape of a cylinder which fits at the end of the tire valve. The dimensions are as follows: length=4 cm, diameter=2 cm, and thickness=1 mm. In the present case, a multi-layer circuit board 82 is circular. The dimensions of the circuit board are as follows: side=2.5 cm and thickness=1 cm. Together, the case and circuit board must weigh less than 50 grams.

A second type housing 86, shown in FIG. 8, has the shape of a rectilinear box which fits at the end of the tire valve. The dimensions are as follows: length=4 cm, side=3 cm, and thickness =2 mm. In the present case, the multi-layer circuit board is square. The dimensions of the circuit board are as follows: side=2.5 cm and thickness=1 cm. Together, the case and circuit board must weigh less than 50 grams.

A third type housing 88, shown in FIG. 9, has the shape of a cylinder which fits at the end of the tire valve. The dimensions are as follows: length=4 cm, diameter=2.5 cm, and thickness=2 mm. In the present case, the multi-layer circuit board has an annular configuration. The dimensions of the circuit board are as follows: outer diameter=2 cm, inner diameter=1.2 cm, and thickness=2.5 cm. Together, the case and circuit board must weigh less than 50 grams, similar to the prior housings.

With consideration now to the forces in which the housing is subjected to, it should be noted that the circuitry will be subject to centripetal forces applied by the turning wheel. For a speed of 50 Kph, the centripetal acceleration is 24 G's and for a speed of 150 Kph, the centripetal acceleration is 213 G's. Since the enclosure weighs under 50 grams, the force applied to the valve is 110 Newtons (approx.) at 150 Kph and at 50 Kph the force is 12 Newtons (approx.) As such, the weight limitations are critical.

With regard to environmental considerations, the circuitry will be operating in cold and warm temperatures, humid and dry, and under the occasional power line where electromagnetic forces may have an impact. The temperature range of the circuit board is between –40° C. to +125° C. To protect the circuit board and related circuitry, the enclosure is water proof, and further seals the tire valve properly.

The circuitry associated with the transmitter of the present embodiment is made up of five sub-circuits, and they include a valve pressure indicator, analog circuit, temperature sensor, digital stage, transmitter, and power supply 90. See FIG. 10. All of such circuitry with the exception of the power supply is secured to the circuit board.

The valve pressure indicator is manufactured by MOTOROLA TM MPX700 SERIES. To get the smallest size possible, the die element of the standard "off-the shelf" package is used. The valve pressure indicator is rated to measure 0 to 100 PSI. A silicon piezoresistive pressure sensor provides a very accurate and linear voltage output directly proportional to the applied pressure.

Operation of the valve pressure indicator will now be described. As the input pressure increases, it causes more stress on the silicon piezoelectric die which outputs a proportional voltage. The typical output voltage varies between 20 to 80 mVdc for 0 to 100 PSI (0 to 700 kPA) respectively at 25 C. The proportional output voltage is sent to the analog circuit.

The analog circuitry is designed using thick film technology because of its durability and operating temperature range. The circuitry fits onto a multi-layer circuit board specified in the foregoing mechanical specifications. The analog circuit is required to condition the input signal for interfacing with the microcontroller input. The analog circuit has three stages including amplification, filtering, and biasing.

The amplification is required to provide a workable voltage to the microcontroller analog to digital converter (8-bit). The amplification required is x40 (approx.) to provide 3 volts at the maximum pressure of 100 PSI (700 kPa).

Filtering is required to attenuate undesired voltage spikes which may affect the analog to digital conversion (ADC). Filtering is an important stage because a spike of 3 volts on the ADC would register as a tire pressure of 100 PSI (700 kPa).

The biasing stage is required to condition the signal before it is applied to the microcontroller input. The biasing stage clips the voltage above 3 volts and below 0 volts. Finally, biasing references the ADC signal to 0 volts.

The temperature sensor is used in conjunction with the microcontroller to compensate the reading taken from the pressure sensor for changes in temperature. In use, the temperature sensor is adapted to determine a current temperature of a surrounding area. The temperature sensor's output voltage varies with temperature, and this voltage is feed to one of the microcontroller's analog to digital channels. With this value, the microcontroller's programming can compensate the pressure measured with temperature variations. This is to prevent confusion between a situation wherein a tire has actual low pressure and a situation wherein such low pressure is due to a change in temperature.

The main digital components are the microcontroller and the EPROM. The microcontroller and EPROM fits onto a multi-layer circuit board in their wafer forms. The suggested microcontroller for the TTPS is the Microchip 8 PIC16C73. This microcontroller is chosen because it has five on board ADC channels, three timers, two capture/compare/PWM modules, eleven interrupt sources, twenty-two I/O pins, power on reset, selectable watchdog timer, wafer form packaging available, and a 3 volt operating voltage.

The job of the microcontroller is to analyze the pressure input and send a data stream containing the pressure information to the radio transmitter. At any time, the microcontroller is adapted to trigger the transmitter to activate the flashing mechanism and speaker only if the tire pressure is less than a pre-programmed nominal pressure level. During normal operation, if their is enough power from the battery during designing, once every 20 min (approx.) the microcontroller triggers the transmitter to transmit an updated compensated specific pressure value to be displayed. Such compensated specific pressure value is a function of both the temperature of the surroundings and further the specific pressure value. To accomplish this, the microcontroller is programmed to go to sleep mode and wake only for a periodic pressure level check or if the tire pressure has gone below the nominal pre-programmed reference pressure level. Each tire is assigned a different transmitter which has on board 8 bit switch select to give each tire a unique source address, or else, for further integration, the tire address can be encoded into the EPROM. In the data stream sent out by the microcontroller, the address of the tire & the tire pressure information is encoded.

The pressure information is transmitted in 32 bit data packets. Their are (6) six pre-amble bits followed by a start bit, address byte, pressure data byte, (5) five cyclic redundancy check bits, and (2) two stop bits. After it is triggered, the transmission is done at a random time, several times during a 30 sec period, to allow other transmitters to relay their information to the receiver. The bit rate to the transmitter is designed to be between 30–100 kbits per second which can easily be programmed.

The radio transmitter of the present embodiment is designed to fit on a multi-layer circuit board described in the mechanical section. The radio transmitter circuit is made up of (6) six sub-circuits including a crystal oscillator, multiplier circuit, modulator circuit, digital data, power amplifier, and antenna. See FIG. 10. In use, the transmitter is adapted to transmit via free space a compensated specific pressure value which is a function of the current temperature.

An 18 MHz crystal oscillator is used to provide the base oscillation for the microcontroller and the multiplier circuit.

The multiplier circuit is used to provide the transmitting frequency by multiplying the oscillator base frequency. The carrier frequency used for this application is 918 MHz.

The modulator circuit modulates the digital data and the carrier frequency. The modulation technique used is digital as the transmitter turns "on" and "off" representing "1" and "0" respectively.

The digital data is provided by the microcontroller, and the bit rate is to be designed to be between 30–100 kbits per second.

The power amplifier is used to drive the signal to the microstrip loop radiator antenna. The signal sent out is designed to provide no more than 50 mV/m, and the harmonics are less than 0.5 mV/m.

The antenna is used to radiate the data. Based on common half wavelength calculations which give a wavelength of approximately 15.52 cm, the antenna is 1.94 cm or less.

The power supply required for the transmitter is a standard 3 volt coin type lithium battery. When the power supply has been drained no transmission occurs for a long time, and the receiver detects this, which prompts the receiver to indicate "Low Batt" on the display.

The receiver of the present embodiment is used to inform the driver or the monitoring agent of the tire pressures. The receiver is made up of three main circuits. They include a high gain radio receiver, bandpass filter, microcontroller, and display. See FIG. 11. In operation, the receiver is adapted to depict on the display the specific pressure value of each of the tires.

The high gain radio receiver amplifies the tiny signals sent out by the tire transmitters, and the bandpass filter removes unwanted electrical noise from the signal. The signals received are analyzed by the microcontroller, and a redundancy check is done with the data stream to find out if an error occurred during transmission.

If a transmission error has occurred the receiver ignores the received packet. The receiver rejects many packets because of the nature of the application and because the communication between transmitter and receiver is one way only.

The transmitters are incapable of determining if another transmitter is transmitting when it wants to transmit. As such, errors are received by the receiver.

When a good packet has been received, the pressure information and source transmitter is decoded and the microcontroller causes the display to show the compensated specific pressure value and source tire number on the display.

The way the information is displayed on the LCD (liquid crystal display) depends on the programming. Preferably, the display depicts the compensated specific pressure value of one tire at a time for several seconds and then switches to the next one. If a major pressure change has occurred, an alarm is programmed to occur, and the display will immediately display the critical tire pressure. The receiver is powered from the vehicle 12 VDC (vehicle power).

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A tire air pressure measuring device for detecting the release of air from a tire and notifying a driver of such an occurrence comprising, in combination:

a plurality of transmitters each coupled to an associated tire, each transmitter including:

a water proof housing having an internally threaded open first end for engaging a valve of a tire, the housing having a cylindrical configuration, the housing having a length of 4 cm, a diameter of 2 cm, and a thickness of 1 mm, wherein each housing has a weight of less than 50 grams;

a valve pressure indicator means secured within the housing, the valve pressure indicator having a needle extending outwardly therefrom to engage a contact point of the valve of the tire, the valve pressure indicator means adapted to determine the amount of pressure within the tire and further generate a specific pressure value of the tire, wherein the valve pressure indicator means comprises a silicon piezoresistive pressure sensor adapted to measure between 0 to 100 PSI and provide a linear voltage output directly proportional to the specific pressure value;

analog circuit means including amplification means for amplifying the linear voltage output by a magnitude of forty, filter means for attenuating undesired voltage spikes, biasing means for clipping the linear voltage output above 3 volts and below 0 volts;

a temperature sensor means secured within the housing for determining a current temperature of a surrounding area, wherein an output voltage of the temperature sensor means is a function of the temperature of the surrounding area;

a transmitter means secured within the housing and connected to the temperature sensor means and valve pressure indicator means, the transmitter means adapted to transmit a compensated specific pressure value consecutively for 30 seconds only upon the triggering thereof, the compensated specific pressure value being a function of both the current temperature of a surrounding area and the specific pressure value of the tire, the compensated specific pressure value being transmitted with six pre-amble bits followed by a start bit, address byte, pressure data byte, five cyclic redundancy check bits, and two stop bits at a bit rate of about 30–100 kbits per second, wherein the transmission means transmits the compensated specific pressure value at under 50 mV/m;

an antenna connected to the transmission means with a length of less than 1.94 cm;

microcontroller means connected to the valve pressure indicator means, analog circuit means, and transmitter means, the microcontroller means adapted to trigger the transmitter means once every 20 minutes and further if the specific pressure value is less than a specific pressure value;

an 8 bit switch situated on the housing to send with each transmission of the specific pressure value a unique identification address;

a 3 volt lithium battery electrically coupled to the valve pressure indicator means, the temperature sensor means, analog circuit means, microcontroller means and the transmitter means, wherein the transmission means is adapted to provide an indication upon the detection of power delivered by the battery falling below a predetermined amount;

a receiver secured within an interior of a rectangular housing, the housing having a flashing light mechanism secured within a front wall thereof, a speaker secured within the front wall thereof adjacent to the flashing light mechanism, the receiver being in communication with the transmitter means, the receiver having wiring extending to electrically couple with the flashing light mechanism, the speaker, and display, the receiver adapted to depict on the display the compensated specific pressure value of one tire at a time with an associated source tire number corresponding to the identification address for several seconds and then switch to a next one, the receiver means further adapted to immediately display the compensated specific pressure value of a tire that has experienced a major change, the receiver means and further adapted to actuate the flashing light mechanism and the speaker upon a change in the compensated specific pressure value of one of the tires which is greater than a predetermined amount.

* * * * *